Oct. 30, 1928.

A. M. DOW 1,689,998

TANK CAR VALVE

Original Filed Feb. 9, 1921   2 Sheets-Sheet 1

Inventor:
Albert M. Dow.
by Munday Clare Carpenter
Attorneys.

Oct. 30, 1928. 1,689,998

A. M. DOW

TANK CAR VALVE

Original Filed Feb. 9, 1921  2 Sheets-Sheet 2

Inventor
Albert M. Dow.
by
Munday Clarke & Carpenter
Attorneys

Patented Oct. 30, 1928.

1,689,998

UNITED STATES PATENT OFFICE.

ALBERT M. DOW, OF EL PASO, TEXAS.

TANK-CAR VALVE.

Application filed February 9, 1921, Serial No. 443,578. Renewed January 17, 1928.

The invention relates to a tank outlet comprising a discharge valve and discharge pipe for tank cars, and has for its object to provide an improved discharge valve and pipe which are simple in construction and efficient in operation and by which the valve is accessible from the outside of the car, so as to be removed or adjusted without the necessity of first cleaning the car.

A further object of the invention is to provide a valve and discharge pipe having opposing flanges which, when riveted together, form a rigid connection; whereby in the event of the tank becoming kinked due to its shifting, or if the discharge pipe be broken, the unseating of the valve will be prevented.

A further object of the invention is to provide a flexible connection such as a universal joint above the valve, so that if the valve cage and discharge pipe should be thrown out of alinement the lift rod will not pull the valve from its seat.

A further object of the invention is to provide a valve having a cage or housing which prevents the unseating of the valve due to surging of the liquid in the tank.

A further object of the invention is to provide the valve housing with a cap or other suitable retaining means to prevent the valve from being lifted from its housing by the operator.

A further object of the invention is to provide a cast iron discharge pipe adapted to be screwed into a flange riveted to the valve housing in the usual location on the bottom of the tank and which pipe may be removed by simply unscrewing it from the flange.

A further object of the invention is to provide a lead gasket between the cage and discharge pipe to insure a tight joint between the two.

A further object of the invention is to provide a valve cage or housing which in addition to forming a guide for the valve, prevents the lodgment of dirt, trash or sediment under the valve.

With such objects in view as well as other advantages which may be incident to the use of the improvements, the invention consists in the parts and combinations thereof hereinafter set forth and claimed with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular construction which, for the purpose of explanation, has been made the subject of illustration.

In the said drawings:—

Referring to the drawings:—

Figure 1:
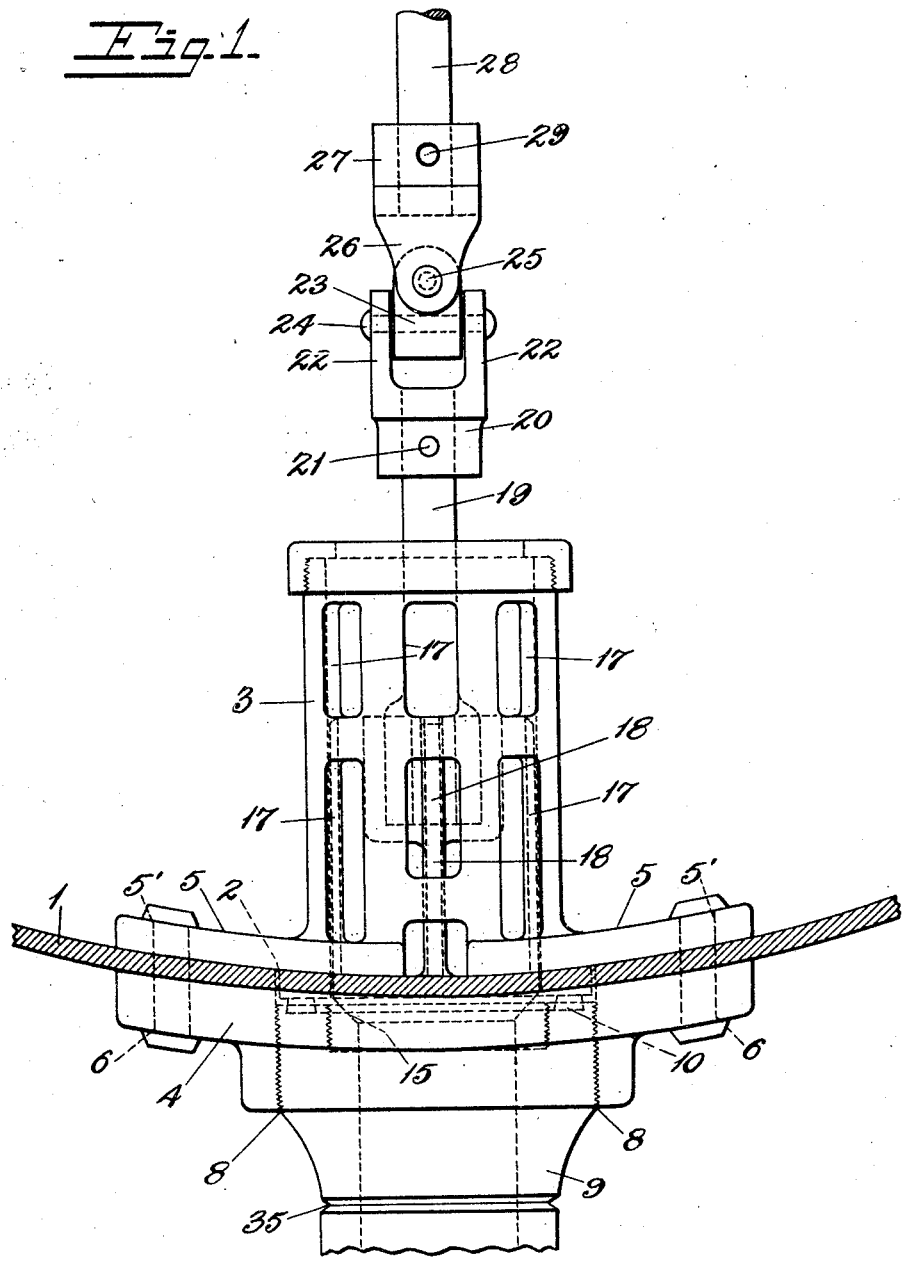
Fig. 1 is a side elevation of the invention in a plane transversely of the tank car with which it is adapted to be used, the discharge pipe being illustrated as partially broken away.
Figure 3:
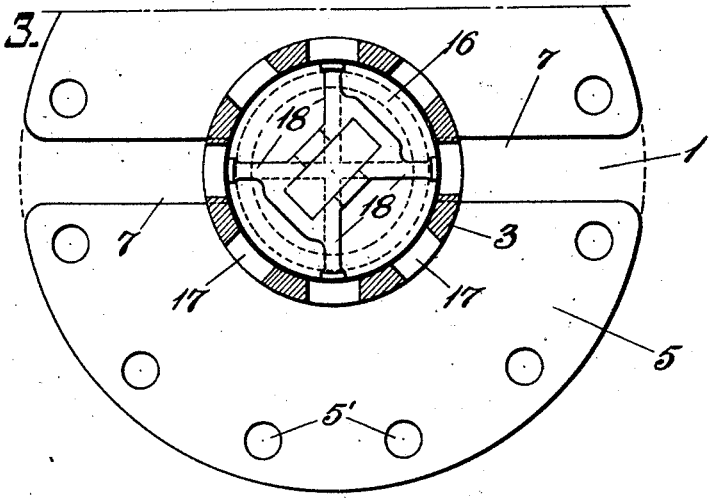
Fig. 3 is a horizontal sectional view on line 3—3 of Fig. 2.
Figure 2:
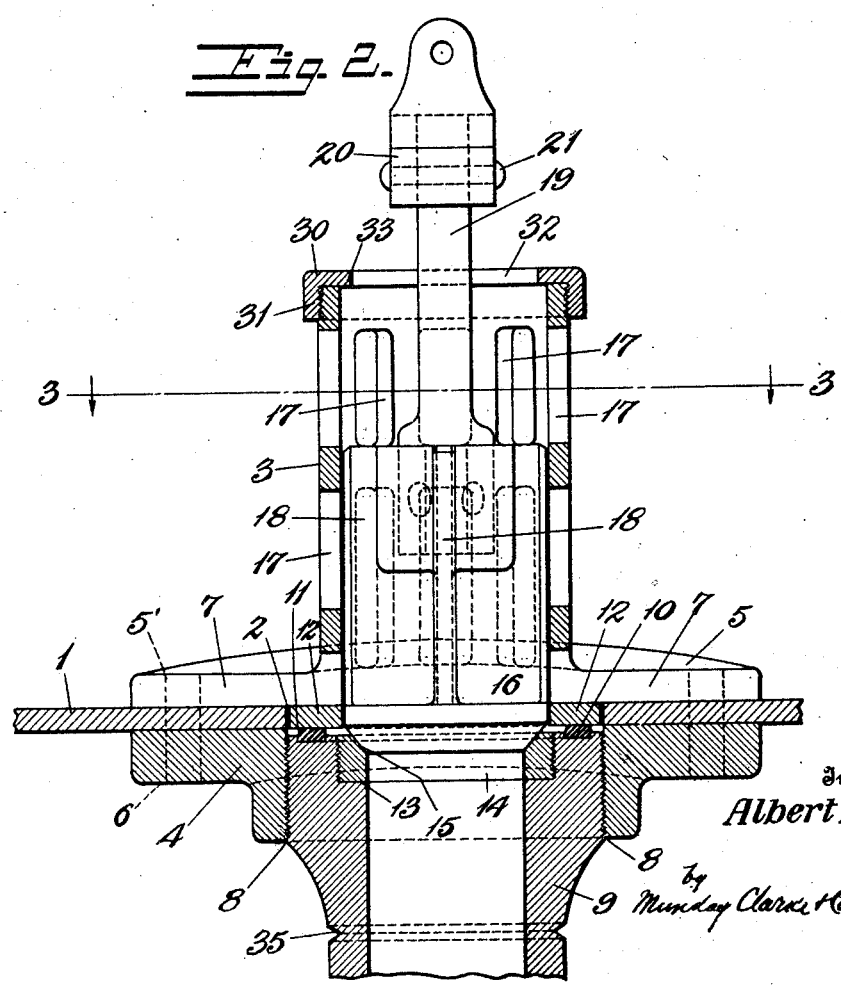
Fig. 2 is a central vertical section of the invention on a plane longitudinally of the tank car.

1 indicates the usual metal tank preferably of cylindrical formation and which is suitably apertured as at 2 for the attachment of the present invention. 3 indicates the valve cage or housing adapted to be positioned on the inside of the tank over the aperture 2 and which is opposed by a circular flanged member 4 on the outside of the tank. The circular flange 5 of the housing is rigidly connected to the member 4 by rivets passing through the tank 1 and holes 5' and 6 in the housing 3 and flanged member 4 respectively. The housing 3 is preferably cut away as at 7 to assist in permitting the admission of the oil or fluid in the tank to the valve.

The flanged member 4 is provided with a centrally positioned screw threaded aperture 8 adapted to receive a similarly screw-threaded discharge pipe 9 which is adapted to receive on its lower end a discharge valve cap (not shown) in the usual manner. An annular gasket 10, preferably of lead, rests in an annular seat or depression 11 on the top surface of the discharge pipe 9 which insures a fluid tight joint between the latter and an annulus or ring 12 at or on the bottom of the valve cage or housing.

The upper part of the discharge pipe 9 is cut away to form a recess 13 into which an annulus 14 is adapted to be screw-threaded and the upper edge of this annulus is flared outwardly at 15 to provide a seat for the valve 16 contained within and extending down from the housing and which is correspondingly flared on its lower end to fit tightly against the removable valve seat member or annulus 14. Thus it will be apparent that when it is desired to inspect or renew the valve seat access may be obtained by simply unscrewing the discharge pipe 9 from the member 4 and it will not be necessary to first enter the tank 1.

The housing 3 is provided with a plurality of ports 17 which permit the admission of oil or other liquid when it is desired to empty or detract from the contents of the tank. It will be apparent that this construction of the housing will prevent any possibility of the valve 16 becoming unseated due to surging of the liquid in the tank.

The valve 16 is provided above its annular seating portion with a series of radially extending wings or guides 18 which serve to position the valve within the housing in a vertical position and to permit its rotation on its seat. Above the guides 18 the valve member is provided with a central upwardly extending vertical stem 19 terminating in a universal joint or other flexible connection comprising preferably a centrally bored member 20 in which the valve stem 19 is rigidly fixed by means of a pin 21. The member 20 is bifurcated forming ears 22 between which a member 23 is pivotally mounted by means of a pin 24. The member 23 is in turn pivotally mounted by means of a pin 25 between ears 26 of a member 27 substantially similar in construction to the member 20. A continuation 28 of the valve stem is rigidly fixed in the member 27 by a pin 29 and this valve stem 28 extends to the top of the tank or to any desired point where it is accessible to manipulate the valve from the outside of the tank in the usual manner. Thus it will be apparent that in the event of the valve cage or housing and discharge pipe being thrown out of alinement, the above described flexible connection will prevent the valve from being pulled from its seat and also serves to maintain the valve 16 tightly seated despite rough or careless handling of the valve stem 28 by the operator.

When it is desired to discharge the contents of the tank 1 the operator pulls upward on the valve stem 28, thus raising the valve 16 from its position on the seat 11 and the liquid within the tank will flow through the ports 17 and cut away portion 7 of the housing to the discharge pipe 9 and thence to its desired destination. To reseat the valve it is only necessary to release the rod 28 whereupon the valve 16 aided by the pressure of the liquid within the tank is forced down upon its seat 15 and further egress of the liquid from the tank is thereby prevented.

The housing 3 is provided with cover 30 which is screw-threaded at 31 to the top of the housing and is apertured as at 32 to permit the longitudinal travel of the valve stem therethrough. The cover 30 prevents the valve structure from being withdrawn from the housing 3 during the manipulation of the valve. The guides 18 strike against the inwardly extending, circumferentially flanged shoulder 33 thus preventing the valve from being lifted from the housing 3.

The discharge pipe 9 is provided with a circumferential groove or weakened portion 35 a slight distance below the flanged member 4. In the event of the discharge pipe striking an obstruction on the track, it will break at the point 35 and not be torn loose from the tank with the result of wasting of the entire contents of the car.

What is claimed is—

1. A discharge valve and discharge pipe for tank cars, comprising in combination: a tank, a valve housing on the interior thereof, a flanged member opposing said valve housing on the exterior of said tank and rigidly secured to said tank and said housing, a discharge pipe removably secured to said flanged member, a valve seat removably carried by said discharge pipe, a valve contained within said housing and adapted to rest on said valve seat, means for operating said valve from the outside of said tank, and means carried by said discharge pipe to effect a liquid tight connection between said discharge pipe and said valve housing.

2. A discharge valve and discharge pipe for tank cars, comprising in combination: a tank, a valve housing on the interior thereof, a flanged member opposing said valve housing on the exterior of said tank and rigidly secured to said tank and said housing, a discharge pipe removably secured to said flanged member, a valve seat removably carried by said discharge pipe, a valve contained within said housing and adapted to rest on said valve seat, means for operating said valve from the outside of said tank, and means carried by said discharge pipe to effect a liquid tight connection between said discharge pipe and said valve housing, said means comprising an annular gasket.

3. In a discharge valve and discharge pipe for tank cars, in combination: a circumferentially curved and apertured tank, a valve housing on the interior of said tank, said valve housing having a convexly curved flange conforming with the curve of said tank, an oppositely disposed flanged member on the exterior of said tank, the flange of said member being concave and conforming with the curve of said tank, a discharge pipe removably secured to said flanged member, said discharge pipe having a flat gasket retaining seat and a valve seat, a seat ring arranged within the aperture of said tank, said seat ring having its upper side curved to conform with the curve of said tank and having its lower side flat, a gasket on said gasket retaining seat of said discharge pipe forming a liquid tight connection between said discharge pipe and said seat ring.

means for connecting said housing and flanged member with the tank, a valve slidably mounted in said housing and resting normally on said valve seat and means whereby the valve may be lifted from its seat.

4. The combination with a tank car of a valve housing rigidly secured within said car; a removable outlet pipe retaining ring rigidly secured to said tank car and to said housing; a valve movable within said housing to allow flow of the contents of the car to said outlet pipe, said housing having ports therein and said housing also being adapted to restrain lateral movement of said valve; means adapted to lift said valve said means having connections to allow a transverse rocking movement of said means between the valve stem and the upper end of said means.

5. The combination with a tank car of a valve guide housing having enlarged ports therein; a valve liftable therein having means engaging said guide housing to prevent lateral displacement of said valve; means for lifting said valve, said means having connections with said valve to allow proper seating of said valve should any coacting elements be distorted; said housing having a flange adapted to be secured to said tank; a retaining ring adapted to be secured on the outside of said tank opposite to said housing flange; means passing through said ring, said tank and said housing flange to rigidly secure said parts together, and an outlet pipe engaging with said ring and affording a seat for said valve.

ALBERT M. DOW.